(12) United States Patent
Kobayashi et al.

(10) Patent No.: US 6,272,249 B1
(45) Date of Patent: *Aug. 7, 2001

(54) IMAGE PROCESSING DEVICE

(75) Inventors: Setsuya Kobayashi, Nara; Takeshi Murakami, Hirakata, both of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,813

(22) Filed: Feb. 6, 1998

(30) Foreign Application Priority Data

Feb. 6, 1998 (JP) .................................................. 9-067760

(51) Int. Cl.[7] ....................................................... G06K 9/62
(52) U.S. Cl. ......................... 382/224; 382/176; 382/218; 382/266; 358/462; 358/467
(58) Field of Search ........................... 382/190, 195–197, 382/205–209, 218–219, 224, 176, 266, 290, 292; 358/448, 457, 462, 467

(56) References Cited

U.S. PATENT DOCUMENTS

| 5,436,644 | * | 7/1995 | Motoi et al. ........................... 347/256 |
| 5,530,559 | * | 6/1996 | Sato ...................................... 358/447 |
| 5,629,752 | * | 5/1997 | Kinjo ...................................... 355/35 |
| 5,902,987 | * | 5/1999 | Coffman et al. ................. 235/462.12 |

FOREIGN PATENT DOCUMENTS

| 0 663758 A2 | 1/1995 | (EP) . |
| 0 710004 A2 | 10/1995 | (EP) . |
| 4-188948 | 7/1992 | (JP) . |
| 4-270561 | 9/1992 | (JP) . |
| 10-084475 | 3/1998 | (JP) . |

* cited by examiner

*Primary Examiner*—Leo Boudreau
*Assistant Examiner*—Gregory Desire

(57) ABSTRACT

The present invention is directed to an image processing device which is capable of discriminating the classification of a particular area of an image at improved accuracy. In an image processing device according to the present invention, an image input from an image signal input portion is processed in the following steps: a vertical and horizontal complexity calculating circuit determines absolute values Tx and Ty of differential densities between pixels neighboring to each other in vertical and horizontal directions, respectively, within a particular area of the image; a diagonal complexity calculating circuit determines absolute values Rx and Ry of differential densities of pixels neighboring to each other in main diagonal and sub diagonal directions, respectively, within the particular area; a comparator circuit compares sums of absolute values in respective directions and outputs a least sum as a complexity to an area discriminating portion; a difference-comparator portion determines a difference between a maximal value Ma and a least value Mi of densities of pixels of the image data and outputs it as a comparison difference value to the area discriminating portion; and the area discriminating portion discriminates the classification of the image area based on the abovementioned complexity value and comparison difference value.

6 Claims, 7 Drawing Sheets

| K6 | K5 | K4 | K5 | K6 |
|----|----|----|----|----|
| K5 | K3 | K2 | K3 | K5 |
| K4 | K2 | K1 | K2 | K4 |
| K5 | K3 | K2 | K3 | K5 |
| K6 | K5 | K4 | K5 | K6 |

FIG.9A CHARACTER 1

| 0 | 0 | -1 | 0 | 0 |
|---|---|---|---|---|
| 0 | 0 | -2 | 0 | 0 |
| -1 | -2 | 13 | -2 | -1 |
| 0 | 0 | -2 | 0 | 0 |
| 0 | 0 | -1 | 0 | 0 |

FIG.9B CHARACTER 2

| 0 | 0 | -1 | 0 | 0 |
|---|---|---|---|---|
| 0 | 0 | -1 | 0 | 0 |
| -1 | -1 | 9 | -1 | -1 |
| 0 | 0 | -1 | 0 | 0 |
| 0 | 0 | -1 | 0 | 0 |

FIG.9C CHARACTER 3

| 0 | 0 | 0 | 0 | 0 |
|---|---|---|---|---|
| 0 | 0 | -1 | 0 | 0 |
| 0 | -1 | 5 | -1 | 0 |
| 0 | 0 | -1 | 0 | 0 |
| 0 | 0 | 0 | 0 | 0 |

FIG.9D HALFTONE DOT 1

| 0 | 0 | 2/48 | 0 | 0 |
|---|---|---|---|---|
| 0 | 2/48 | 4/48 | 2/48 | 0 |
| 2/48 | 4/48 | 24/48 | 4/48 | 2/48 |
| 0 | 2/48 | 4/48 | 2/48 | 0 |
| 0 | 0 | 2/48 | 0 | 0 |

FIG.9E HALFTONE DOT 2

| 0 | 0 | 1/24 | 0 | 0 |
|---|---|---|---|---|
| 0 | 1/24 | 2/24 | 1/24 | 0 |
| 1/24 | 2/24 | 2/24 | 2/24 | 1/24 |
| 0 | 1/24 | 2/24 | 1/24 | 0 |
| 0 | 0 | 1/24 | 0 | 0 |

FIG.9F HALFTONE DOT 3

| 0 | 0 | 0 | 0 | 0 |
|---|---|---|---|---|
| 0 | 0 | 1/8 | 0 | 0 |
| 0 | 1/8 | 4/8 | 1/8 | 0 |
| 0 | 0 | 1/8 | 0 | 0 |
| 0 | 0 | 0 | 0 | 0 |

FIG.9G MIXTURE

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG.9H PHOTOGRAPH

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

| (i-2,j-2) | (i-1,j-2) | (i,j-2) | (i+1,j-2) | (i+2,j-2) |
| --- | --- | --- | --- | --- |
| (i-2,j-1) | (i-1,j-1) | (i,j-1) | (i+1,j-1) | (i+2,j-1) |
| (i-2,j) | (i-1,j) | (i,j) | (i+1,j) | (i+2,j) |
| (i-2,j+1) | (i-1,j+1) | (i,j+1) | (i+1,j+1) | (i+2,j+1) |
| (i-2,j+2) | (i-1,j+2) | (i,j+2) | (i+1,j+2) | (i+2,j+2) |

IMAGE PROCESSING DEVICE

BACKGROUND OF THE INVENTION

The present invention relates to an image processing device for determining an image area of image data obtained from an original by scanning, which is usable for digital copying machines, scanners and so on.

In conventional digital copying machines and scanners, image data inputted from an original through a CCD (Charge-Coupled Device) sensor or the like is subjected to processing for improving the image quality. For example, Japanese Laid-open Patent Publication (TOKKAI HEI) No. 4-188948 discloses an image processing device that discriminates a particular area of the image based on a feature extracted read-in image data and executes processing for further improving the quality of the image. According to this method, an average dispersion of differences of image data is determined relative to an average value obtained in a particular area of the image to discriminate the particular area as a character area if the average dispersion value is larger than the average value or as a halftone area if the average dispersion value is smaller than the average value, and the image processing is made adaptively to the discrimination result.

Japanese Laid-open Patent Publication (TOKKAI HEI) No. 4-270561 discloses another image processing device that sets two upper and lower thresholds Tb and Tc (Tb >Tc), discriminates a particular area as a character area if the pixel density of the area is larger than the threshold Tb and smaller than the threshold Tc or as a halftone area if the pixel density is between Tb and Tc, and performs the image processing according to the discrimination result.

The former of the above-mentioned two image-discriminating methods involves a problem that the difference between an average dispersion value and an average value does not always sufficiently represent the feature of an image area and, therefore, may sometime make an error in discrimination of the image. This method may sometime have inadequate criteria and unsuitable average values as thresholds. Namely, further improvement of area discrimination accuracy is required.

The latter image discriminating method may reflect only a limited feature in the discrimination result since it discriminates an image area according to only two thresholds. Consequently, it cannot achieve a high accuracy discrimination of the image and have a high probability of misjudgment of the image, making it difficult to improve the image quality by further image processing.

Accordingly, the present applicant has proposed an image discriminating method which, as disclosed in Japanese Patent Application No. 8-238205, is free from the above-mentioned problems. Namely, this method estimates a feature value of a particular image area according to differences between optical densities of pixels neighboring to each other in horizontal and vertical directions in the area and discriminates the classification of that particular image area according to the feature value.

Therefore, the present invention has as its primary object the provision of an image processing device which can attain a further improved accuracy of discrimination of the classification of a particular image area to be processed for improving its quality.

SUMMARY OF THE INVENTION

To achieve the above-mentioned object, the present invention provides an image processing device for reading image information, discriminating the classification of a particular image area composed of a plurality of pixels and processing the image area by filtering according to the classification resulted from the discriminating, which comprises feature calculating means for determining a feature value of the particular area according to differences in optical densities of pixels disposed in vertical, horizontal, main diagonal and sub diagonal (perpendicular to the main diagonal) directions within the particular area, and area discriminating means for determining the classification of the particular area on the basis of the estimated feature value.

In this device, the classification of a particular area of an image can be discriminated at increased accuracy since a feature value used for discriminating the classification of a particular image area is determined according to differences between optical densities of pixels disposed in four (horizontal, vertical, main diagonal and sub diagonal) directions in the area. The image area may be classified, by way of example, into a photographic area, a character area and a halftone dot area.

The feature value estimating means comprising: least value obtaining means for calculating a total value of differential densities of pixels neighboring to each other in the vertical direction in a particular area, a total value of differential densities of pixels neighboring to each other in the horizontal direction in the particular area, a total value of differential densities of pixels neighboring to each other in the main diagonal directions in the particular area and a total value of differential densities of pixels neighboring to each other in the sub diagonal directions in the particular area and determining a least one of the total values of differential densities as a feature value of the particular area, and differential value obtaining means for determining a difference between the maximal density value and minimal density value of the pixels within the particular area as a feature value of the particular area.

The feature value estimating means may also be composed of least value obtaining means for adding a total value of differential densities of pixels neighboring to each other in the vertical directions in the particular area to a total value of differential densities of pixels neighboring to each other in the horizontal directions in the particular area, adding a total value of differential densities of pixels neighboring to each other in the main diagonal directions in the particular area to a total value of differential densities of pixels neighboring to each other in the sub diagonal directions in the particular area and determining a least one of two summed values as a feature value of the particular area and differential value obtaining means for determining a difference between the maximal density value and minimal density value of the pixels within the particular area as a feature value of the particular area.

The feature amount of the particular image area, which was determined on the basis of the differential densities of pixels disposed in the horizontal and vertical directions and/or diagonal directions, can indicate the degree of complexity of the particular area and can also reflect the correlation between pixels on the classification of the area. This improves the accuracy of discrimination of the image area classification.

BRIEF DESCRIPTION OF DRAWINGS

FIGS. 9A to 9H are a view showing coefficients used respectively for a smoothing process.

PREFERRED EMBODIMENTS OF THE INVENTION

Referring to accompanying drawings, preferred embodiments of the present invention will be described below in detail.

First Embodiment

Figure 2:
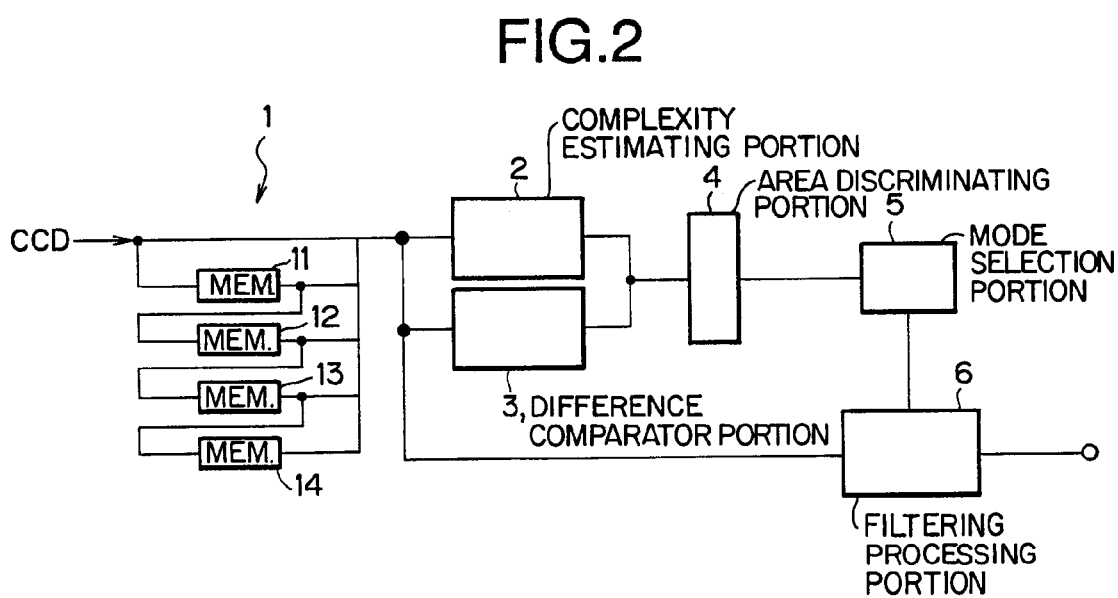
FIG. 2 is a block diagram showing the construction of an image processing device according to the present invention.

FIG. 2 is a construction block-diagram of an image processing device which is a first embodiment of the present invention. This image processing device designed for use in digital copying machines, scanners and the like to read image information through, e.g., a charge-coupled device (CCD) sensor and discriminate the classification of a particular image area (hereinafter called a particular area) composed of a pixel of interest and plural pixels surrounding the pixel of interest (5×5 pixels in this example). The device comprises an image data input portion 1 for storing input image data, a complexity estimating portion 2 and a difference-comparator portion 3, both of which serve as feature value calculating means for determining features of the particular area, an area discriminating portion 4 which serves as area discriminating means for discriminating the classification of the particular area on the basis of the feature value, a mode selecting portion 5 for selecting a filtering process mode, and filtering processing portion 6 for performing filtering processing of the particular area according to the selected mode.

The image signal input portion 1 consists of multiple lines (four lines in FIG. 2) of memories 11, 12, 13 and 14 and stores 8-bit image data obtained from an original by scanning with a CCD sensor into 4 parallel lines of memories 11, 12, 13 and 14 as synchronized with the system clock. Image data from five lines are always output to the complexity estimating portion 2, difference-comparator portion 3 and filtering processing portion 6 according to the number of pixels in a particular area.

Figure 1:
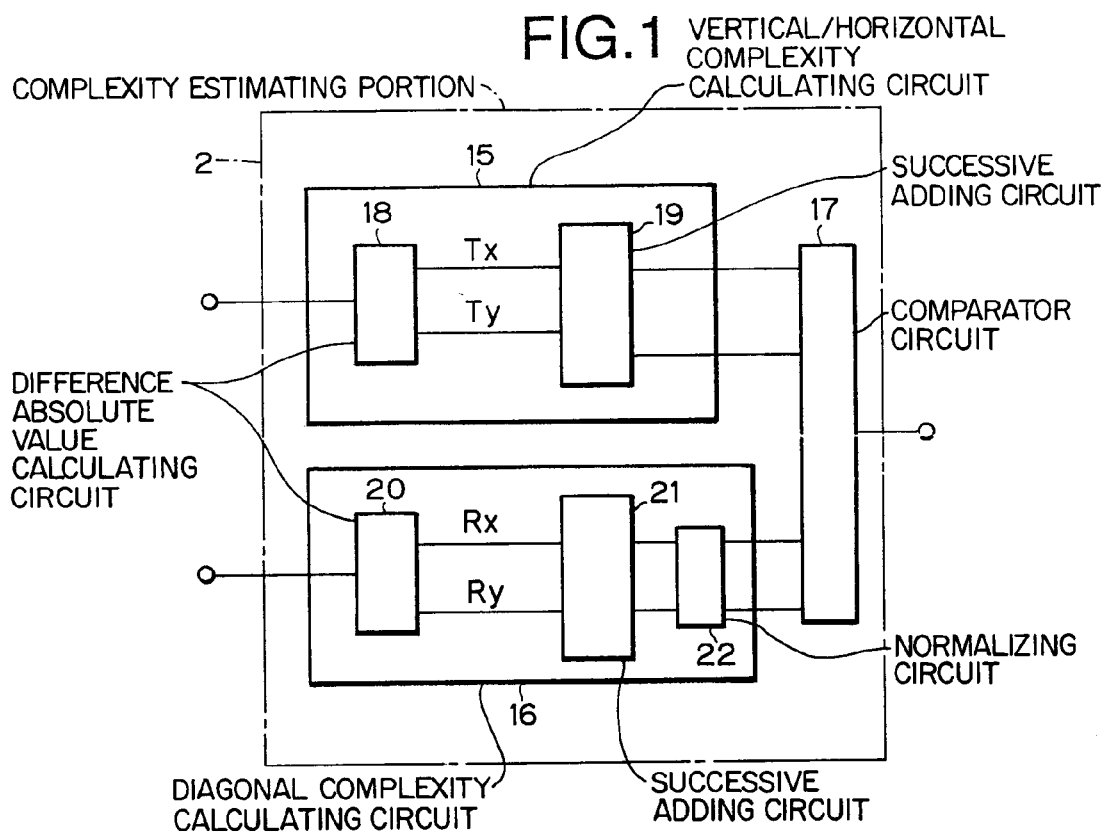
FIG. 1 is a block diagram showing the construction of the complexity determining portion of an image processing device according to the present invention.

FIG. 1 is a block diagram for explaining the construction of the area complexity estimating portion 2 shown in FIG. 2. This complexity estimating portion 2 consists of a vertical/horizontal complexity calculating circuit 15 for determining the complexity in vertical and horizontal directions in a particular area, a diagonal complexity calculating circuit 16 for determining the complexity in vertical and horizontal directions in a particular area and a comparator circuit 17 for comparing values obtained by both circuits 15 and 16 respectively. The vertical/ horizontal complexity calculating circuit 15, diagonal complexity calculating circuit 16 and comparator circuit 17 serves as least value obtaining means.

The vertical/horizontal complexity calculating circuit 15 includes a difference absolute value calculating circuit 18 and successive adder circuit 19. The diagonal complexity calculating circuit 16 includes a difference absolute value calculating circuit 20, successive adding circuit 21 and a normalizing circuit 22.

5-line 8-bit image data from the image signal input portion 1 enters to the difference absolute value calculating circuits 18 and 20, respectively, of the vertical/horizontal and diagonal complexity calculating circuits 15 and 16, by which the complexity value of the particular area is determined.

Figure 3B:
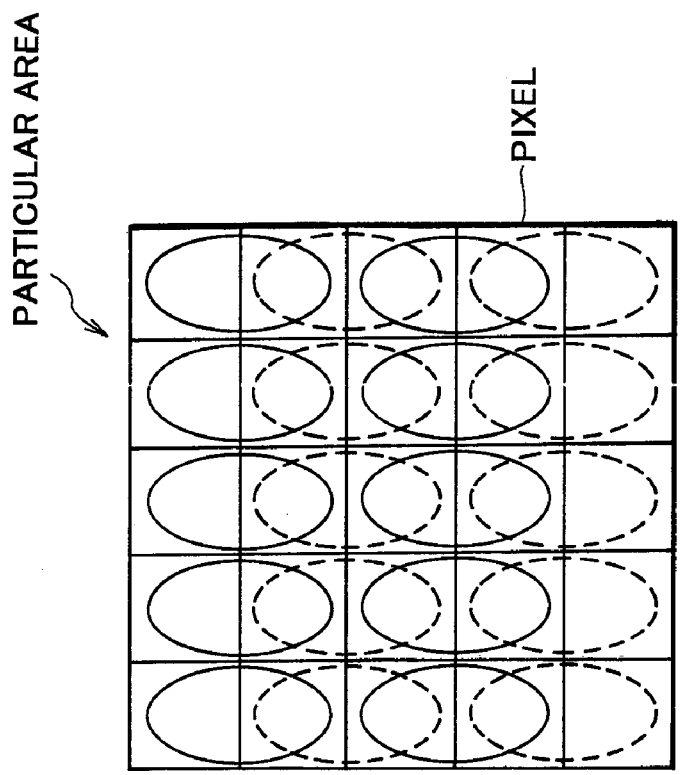
FIG. 3B is illustrative of a particular area containing pixels neighboring to each other in vertical direction.
Figure 3A:
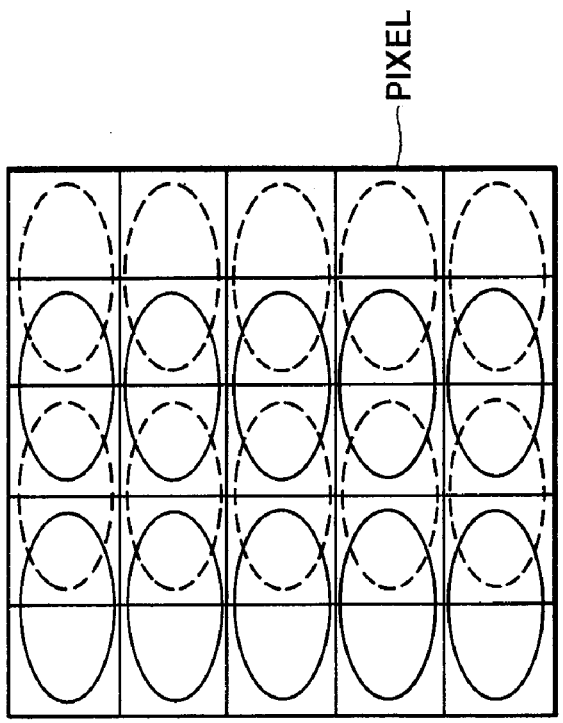
FIG. 3A is illustrative of a particular area containing pixels neighboring to each other in horizontal direction.

In practice, the difference absolute value calculating circuit 18 of the vertical/horizontal complexity calculating circuit 15 determines absolute values Tx of differences in optical density of pixels neighboring to each other in the horizontal direction of the particular area. The number of combinations of neighboring pixels is 20 (4 pixels×5 rows) as shown in FIG. 3A. (The combinations of neighbors illustrated each by a solid-line oval and a dotted-line oval.)

The difference absolute value calculating circuit 18 also determines absolute values Ty of differences in optical density of pixels neighboring to each other in the vertical direction of the particular area. The number of combinations of neighboring pixels is 20 (4 pixels×5 columns) as shown in FIG. 3B. The successive adder circuit 19 determines a sum of the calculated absolute values Tx (in the horizontal direction) and a sum of the calculated absolute values Ty (in the vertical direction) respectively.

Figure 4B:
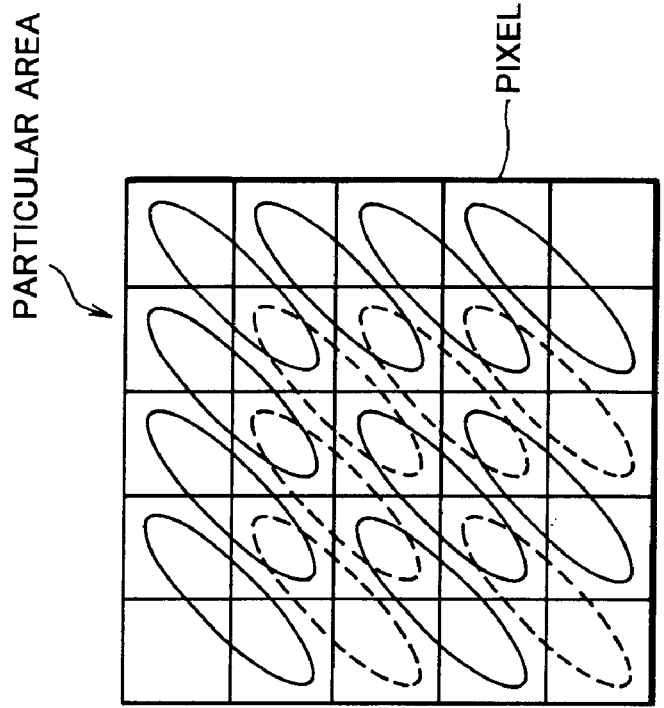
FIG. 4B is illustrative of a particular area containing pixels neighboring to each other in sub-diagonal direction.
Figure 4A:
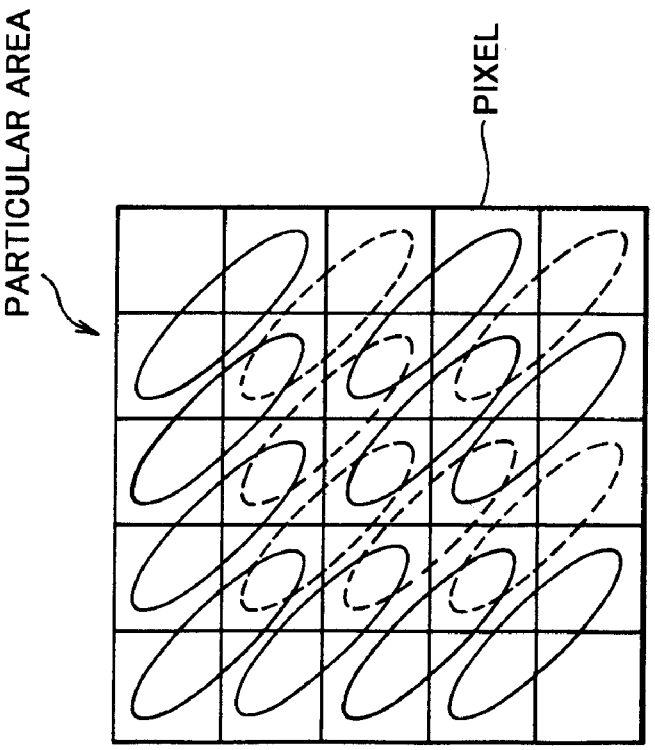
FIG. 4A is illustrative of a particular area containing pixels neighboring to each other in main diagonal direction.

The difference absolute value calculating circuit 20 of the diagonal complexity calculating circuit 16 determines absolute values Rx of differences in optical density of pixels neighboring to each other in a diagonal direction (hereinafter called <main diagonal direction>) the particular area. In the shown case, the number of combinations of neighboring pixels is 16 as shown in FIG. 4A.

The difference absolute value calculating circuit 20 also determines absolute values Ry of differences in optical density of pixels neighboring to each other in the other diagonal direction (hereinafter called <sub-diagonal direction) perpendicular to the main diagonal of the particular area. The number of combinations of neighboring pixels is 16 as shown in FIG. 4B. The successive adder circuit 21 determines a sum of the calculated absolute values Rx (in the main diagonal direction) and a sum of the calculated absolute values Ry (in the sub diagonal direction) respectively.

The normalizing circuit 22 performs the normalization of the obtained data. The normalization is a process for apparently matching the number of pixel combinations in the main and sub diagonal directions to the number of pixel combinations in the horizontal and vertical directions before comparing the complexity values in the main and sub diagonal directions with those in the horizontal and vertical directions in the particular area. In the shown case, the particular area has 40 combinations of neighboring pixels in the horizontal and vertical directions and 32 combinations of neighboring pixels in the main diagonal and sub diagonal directions. Accordingly, the value in the diagonal directions is multiplied by 40/32 (5/4) to match the value with the value in the horizontal and vertical directions.

The comparator circuit 17 compares the sums of absolute values obtained in respective directions and outputs a least sum in 13 bits as the complexity of the particular area to the area discriminating portion 4 at the next stage.

Figure 5:
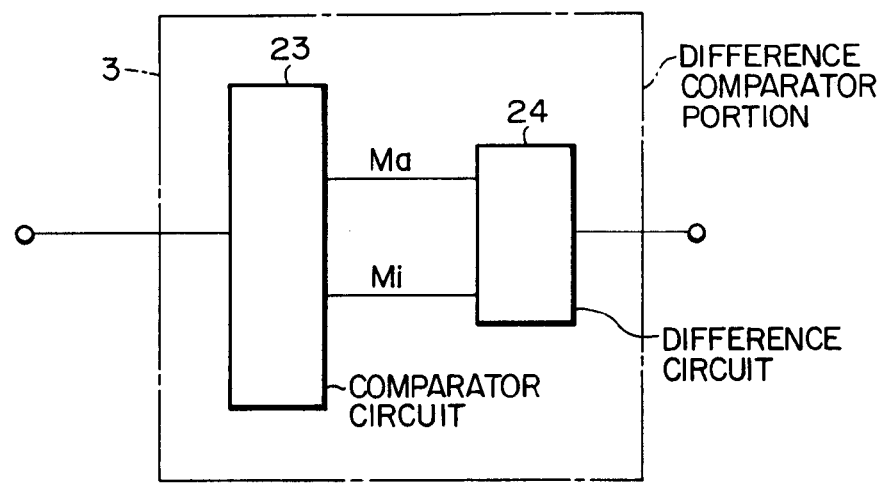
FIG. 5 is a block construction diagram of a comparison and difference-comparator portion.

FIG. 5 is a block diagram for explaining the construction of the difference-comparator portion 3 shown in FIG. 2. This difference-comparator portion 3 is composed of a comparator circuit 23 and a difference circuit 24, both of which serve as difference value obtaining means. Image data from the image input portion 1 is transferred to the comparator circuit 23 that in turn determines a maximal value Ma and a least value Mi of optical densities of the pixels existing in rows (No. 1–5) in the particular area and, then, the difference circuit 24 determines a difference between the maximal value Mx and the least value Mi and transfers an 8-bit signal of the comparison difference value to the area discriminating portion 4 at the next stage.

The feature value of the particular area is calculated on the basis of optical density differences of neighboring pixels in horizontal, vertical, main diagonal and sub diagonal directions, thus assuring an increased accuracy of determination of the complexity in the particular area. The correlation between the pixels is reflected on the discrimination of the particular area classification, attaining an improved accuracy of the discrimination of the classification of the particular area as described later.

Figure 6:
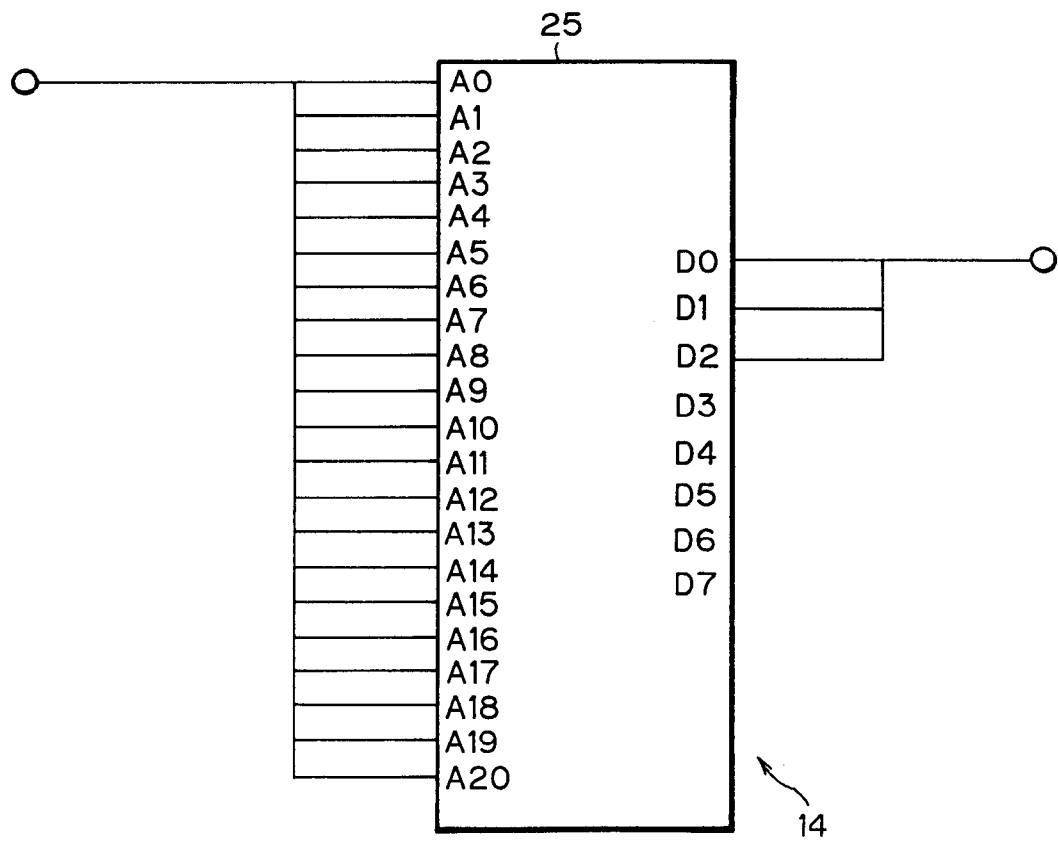
FIG. 6 is a block construction diagram of an area discriminating portion.

FIG. 6 is a block diagram for explaining the construction of the area discriminating portion 4 shown in FIG. 2. This area discriminating portion 4 is composed of a high-speed SRAM 25 having 21-bit address terminals A0–A20 at its input side and 8-bit data terminals D0–D7 at its output side.

The area discriminating portion receives the complexity signal (13 bits) from the complexity estimating portion 2 at the address terminals A0–A20 of the SRAM 25 and discriminates the classification of the particular area that may belong to, e.g., a character area or a halftone area or a photographic area.

Figures 7, 8:
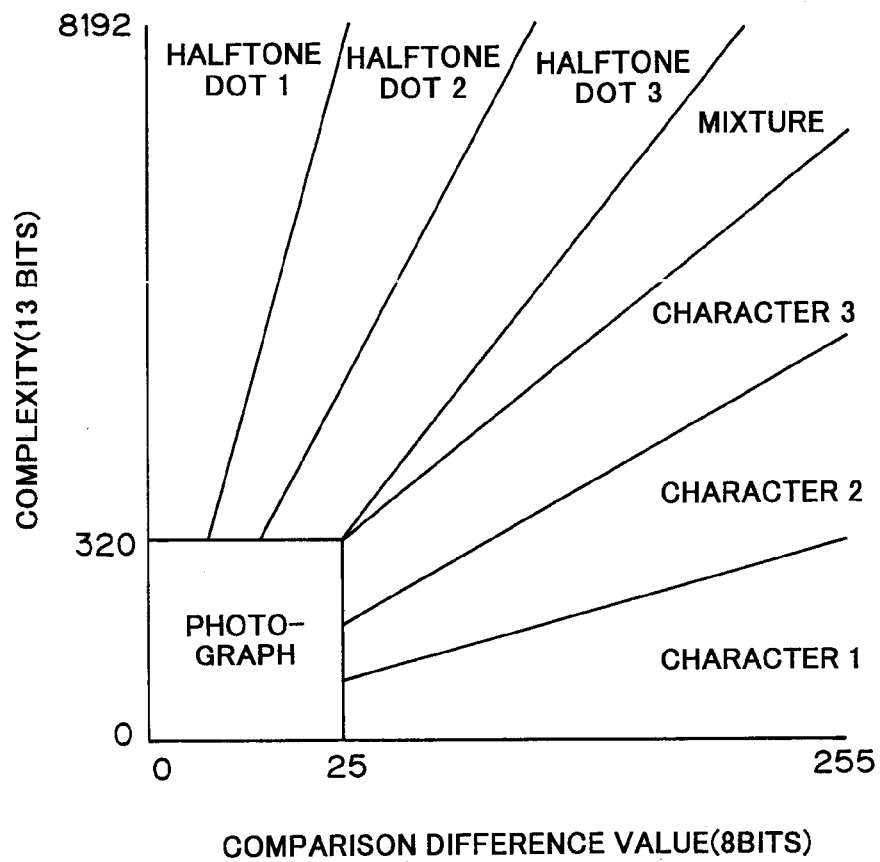
FIG. 7 is a view for explaining a method of determining the classification of a particular area.
FIG. 8 is a view showing coefficients of pixels of a particular area.

As shown in detail in FIG. 7, the particular area may be classified into following preset types: halftone dot 1, halftone dot 2, halftone dot 3, mixture (halftone dot and character), character 1, character 2, character 3 and photograph. The classification of the particular area is discriminated on the basis of the complexity values and the compared difference value. The discrimination result through 3-bit output terminals (D0–D3) is output to the mode selecting portion 5 at the next stage.

Based on the area discrimination result received from the area discriminating portion 4, the mode selecting portion 5 decides a coefficient value necessary for enhancing and smoothing operations and sends it to the filtering processing portion 6. A coefficient map shown by way of example in FIG. 8 may be applied for a particular area consisting of 5×5 pixels. Values of coefficient K1–K6 are previously determined. FIGS. 9A to 9 H show examples of values of coefficients for practical use. Namely, the mode selecting portion 5 selects concrete coefficient values K1–K6 for use in the next processing according to the discrimination result and transmits it to the filtering processing portion 6. These coefficients can be set within the range of −16 to +16.

Figures 10, 11:
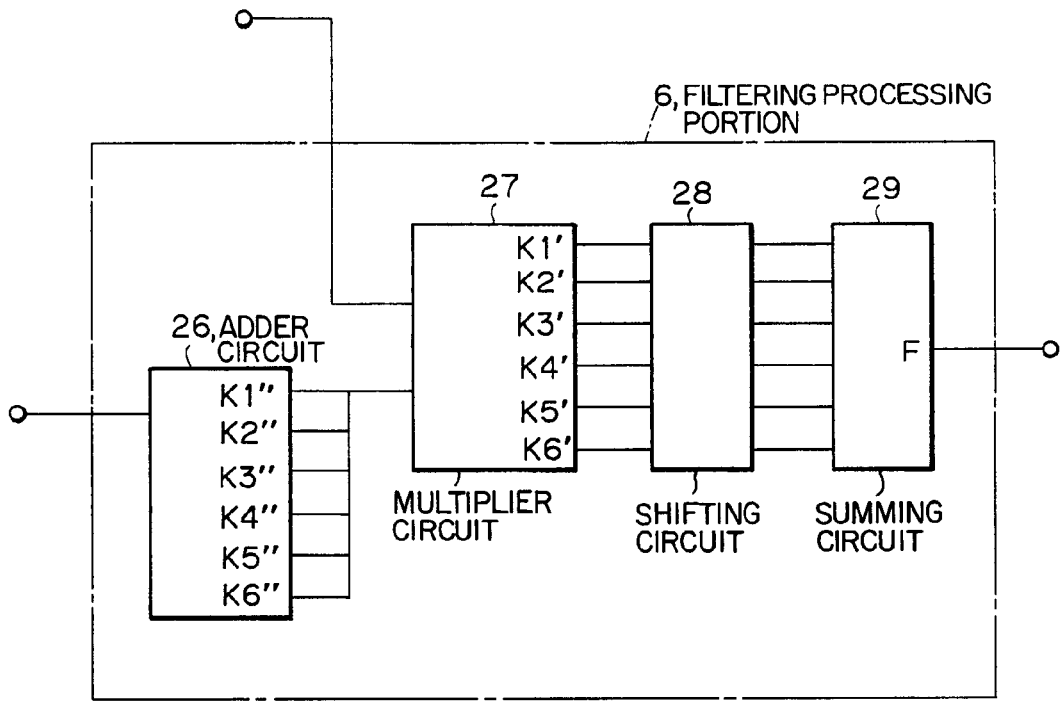
FIG. 10 is a block construction diagram of a filtering processing portion.
FIG. 11 is a view showing coordinates of pixels of a particular area.

FIG. 10 is a block diagram showing the construction of the filtering processing portion 6 of FIG. 2. This portion consists of an adder circuit 26, a multiplier circuit 27, a shifting circuit 28 and a summing circuit 29.

Based on the coefficient values K1–K6 received from the mode selecting portion 5, the filtering processing portion 6 performs, for example, enhancement operation on the particular area discriminated by the area discriminating portion 4 as a character area, or smoothing operation on the particular area discriminated as a halftone area, or does not conduct any processing if the particular area was discriminated as a photographic area.

Referring to FIG. 10, the case of performing the smoothing operation on the particular area is described below:

Image data from the image signal input portion 1 is temporarily latched in a flip-flop (not shown). Operations are then performed on the data on the basis of coefficient values shown in FIG. 9. The adder circuit 26 determines sums K1"–K6" of image data for respective coefficients according to the data map of 5×5 pixels (see FIG. 11). The sum values K1"–K6" of image data for respective coefficients are expressed as follows:

$$K1'' = (i, j) \quad (1)$$

$$K2'' = \{(i, j-1) + (i-1, j) + (i+1, j) + (i, j+1)\} \quad (2)$$

$$K3'' = \{(i-1, j-1) + (i+1, j-1) + (i-1, j+1) + (i+1, j+1)\} \quad (3)$$

$$K4'' = \{(i, j-2) + (i-2, j) + (i+2, j) + (i, j+2)\} \quad (4)$$

$$K5'' = \{(i-1, j-2) + (i+1, j-2) + (i-2, j-1) + (i+2, j-1) + (i-2, j+1) + (i+2, j+1) + (i-1, j+2) + (i+1, j+2)\} \quad (5)$$

$$K6'' = \{(i-2, j-2) + (i+2, j-2) + (i-2, j+2) + (i+2, j+2)\} \quad (6)$$

Then, the sum values K1"–K6" determined by the adder circuit 26 are multiplied by the corresponding coefficients K1–K6 respectively. The products are expressed as follows:

$$K1'=K1 \times K1'' \quad (7)$$

$$K2'=K2 \times K2'' \quad (8)$$

$$K3'=K3 \times K3'' \quad (9)$$

$$K4'=K4 \times K4'' \quad (10)$$

$$K5'=K5 \times K5'' \quad (11)$$

$$K6'=K6 \times K6'' \quad (12)$$

For example, a halftone dot 1 shown in FIG. 9D is smoothed with the coefficient K2=4/48. In this case, the multiplier circuit 27 multiplies each sum value by 4 for each coefficient and then the shifting circuit 28 shifts each product according to a specified shift value (48 for the shown case) and divides the product.

The summing circuit 29 determines a total sum F according to the following equation (3):

$$F=K1'+K2'+K4'+K5'+K6' \quad (13)$$

The total sum value F is output as a product of the filtering process. After this, the image recognition will be separately conducted.

Second Embodiment

A second embodiment of the present invention is now described as follows:

The second embodiment is featured by that the complexity estimating portion 2 shown in FIG. 1 is further provided with least-value obtaining means that compares a total difference in optical-density of pixels in horizontal and vertical directions in a particular area with a total difference in optical density of pixels in main and sub diagonal directions and outputs a smaller value as the complexity of the particular area.

The comparison of total differences in respective directions can clearly distinguish from each other the differences in horizontal, vertical, main diagonal and sub diagonal directions, thus making further recognition of the complexity in respective directions easier. This can attain increased accuracy of the area discrimination. Other components of this embodiment are the same as those of the first embodiment.

In practice, the difference absolute value calculating circuit 18 of the vertical/horizontal complexity calculating circuit 15 (FIG. 1) determines absolute values Tx of differences in optical density of pixels neighboring to each other in the horizontal direction of a particular area. It also determines absolute values Ty of differences in optical density of pixels neighboring to each other in the vertical direction of the particular area. The successive adder circuit 19 determines a sum of the calculated absolute values in the vertical direction and the horizontal direction respectively and determines a total of the two sums.

The difference absolute value calculating circuit 20 of the diagonal complexity calculating circuit 16 determines absolute values Rx of differences in optical density of pixels neighboring to each other in a diagonal direction of the particular area and absolute values Ry of differences in optical density of pixels neighboring to each other in the sub diagonal direction of the particular area. The successive adder circuit 21 determines a sum of the calculated absolute values Rx (in the main diagonal direction) and a sum of the calculated absolute values Ry (in the sub diagonal direction) respectively and then obtains a total of the two sums.

The normalizing circuit 22 normalizes the obtained data and the comparator circuit 17 compares the total sum of absolute values in the vertical/horizontal directions with the total sum of the absolute values in the main/sub diagonal directions. The smaller value is taken as the estimated complexity value (expressed in 13 bits) that is output to the area discriminating portion 4 at the next stage.

Although the present invention has been described with reference to the preferred embodiments, the description is illustrative and does not restrict the invention. Various modifications and variations may be made thereto without departing from the scope of the invention as defined in the appended claims.

According to the present invention, feature values of a particular area of an input image are estimated based on the differences in optical density of pixels in the vertical and horizontal directions and in main and sub diagonal directions in that area and the classification of the particular area is then discriminated on the basis of the above-mentioned feature values, thus assuring improved accuracy of the area discrimination. This makes it possible to adaptively process an objective area of an image to improve the image quality.

In particular, the use of the feature value estimated in the diagonal directions in addition to the feature value estimated in the vertical and horizontal directions surely increases the accuracy of discrimination.

The feature values determined based on the differences between optical densities of pixels neighboring to each other in the vertical and horizontal directions or in the diagonal directions can represent the complexity in the particular area and reflect the correlation of the neighboring pixels on the discrimination of the area classification. The feature value in the vertical/horizontal direction in the particular area can be clearly distinguished from the feature value in the diagonal directions therein. Namely, the feature to be selected may be easily recognized. Consequently, the classification of the particular area can be discriminated with increased accuracy.

What is claimed is:

1. An image processing device, comprising:
    a memory for storing image data from an input image signal read by an image reader;
    a complexity estimating circuit for determining complexity values for a particular area of said read-in image, said particular area having a plurality of neighboring pixels; and
    a comparator circuit for determining maximal and minimal values of optical densities for specified pixels existing within said particular area;
    said complexity estimating circuit further including:
        a difference circuit for determining absolute values of differences, Tx and Ty, in optical density between pixels adjacent to each other along imaginary horizontal and vertical direction lines across said particular area, and for determining absolute values of differences, Rx and Ry, in optical density between pixels adjacent to each other along crossing main-diagonal and sub-diagonal direction lines across said particular area,
        wherein sums of the differences between Tx and Ty are added to provide a first complexity value to said comparator circuit, and wherein sums of the differences between Rx and Ry are also added; and
        a normalizing circuit for matching a number of pixel combinations in said main and sub-diagonal directions with a number in said horizontal and vertical directions to provide a second complexity value to said comparator circuit,
    wherein said comparator circuit compares said first and second complexity values, outputting the smaller of the values to a discriminator circuit that classifies a particular area based on said received complexity value.

2. The image processing device of claim 1, further including:
    a mode selecting circuit for selecting a filtering process mode based on said classification; and
    a filtering processing portion for filtering said particular area based on said selected filtering process mode, thereby outputting filtered image data for image recognition.

3. The image processing device of claim 1, said particular area including a pixel of interest and plural pixels surrounding said pixel of interest.

4. An image processing method, comprising:

determining a complexity value for a particular area of a read-in image, said particular area having a plurality of neighboring pixels, said step of determining further including:

determining absolute values of differences, Tx and Ty, in optical density between pixels adjacent to each other along imaginary horizontal and vertical direction lines across said particular area, determining absolute values of differences, Rx and Ry, in optical density between pixels adjacent to each other alone crossing main-diagonal and sub-diagonal direction lines across said particular area, wherein sums of the differences between Tx and Ty are added to provide a first complexity value, and wherein sums of the differences between Rx and Ry are also added; and matching a number of pixel combinations in said main and sub-diagonal directions with a number in said horizontal and vertical directions to provide a second complexity value, wherein said first and second complexity values or compared, the smaller of the values being output to control a discriminator circuit; and classifying a particular area in said discriminator circuit based on said received complexity and difference values.

5. The method of claim 4, further including:

selecting a filtering process mode based on said discriminated classification; and filtering said particular area based on said selected mode, thereby providing filtered image data for image recognition.

6. The method of claim 5, further including enhancing and smoothing said classified particular area prior to filtering.

\* \* \* \* \*